United States Patent [19]

Dearman

[11] Patent Number: 4,483,059

[45] Date of Patent: Nov. 20, 1984

[54] CLAMPING AND SPACING TOOL

[76] Inventor: Timothy C. Dearman, P.O. Box 937, Pearland, Tex. 77581

[21] Appl. No.: 486,565

[22] Filed: Apr. 20, 1983

Related U.S. Application Data

[63] Continuation of Ser. No. 299,045, Sep. 3, 1981, abandoned.

[51] Int. Cl.³ .............................................. B23Q 3/18
[52] U.S. Cl. .................................... 29/272; 29/281.5; 228/49 B; 269/43; 269/87; 269/203; 269/228; 269/902
[58] Field of Search .................. 269/228, 43, 87, 902, 269/203, 258–264; 29/272, 268, 281.5, 270, 282; 228/49 R, 49 B; 81/468, 426; 7/125, 170; 33/21 C, 174 N

[56] References Cited

U.S. PATENT DOCUMENTS

| | | | |
|---|---|---|---|
| 1,918,439 | 7/1933 | Warman | 269/258 |
| 2,659,972 | 11/1953 | Norris | 33/21 C |
| 3,811,668 | 5/1974 | Kotter | 269/258 |
| 3,964,352 | 6/1976 | Dukes | 81/426 |
| 3,984,092 | 10/1976 | Fitzpatrick | 269/258 |
| 4,306,345 | 12/1981 | Dearman | 29/272 |

FOREIGN PATENT DOCUMENTS 30250 of 1897 United Kingdom ................ 269/262

*Primary Examiner*—Robert C. Watson
*Attorney, Agent, or Firm*—Learman & McCulloch

[57] ABSTRACT

A tool for use in welding a pipe to a fitting and wherein a gap is to be provided between the end of the pipe and an internal shoulder in the fitting. The tool has support arms provided with jaws that may be clamped onto the pipe and shims that may be manipulated to provide the gap. The tool has scribes for inscribing marks on the fitting and on the pipe to facilitate inspections following welding operations. The jaws are pivotal relative to the support arms to facilitate welding operations.

15 Claims, 7 Drawing Figures

CLAMPING AND SPACING TOOL

This is a continuation of application Ser. No. 299,045 filed Sept. 3, 1981, now abandoned.

BACKGROUND OF THE INVENTION

When a pipe is to be joined to a fitting having an internal shoulder it is common for the free end of the pipe to be inserted into the fitting to an extent sufficient to enable the end of the pipe to abut the shoulder. The pipe and fitting should not be welded together in such relative positions, however, because of the likelihood that the weld, the pipe, or the fitting will crack or break due to thermal expansion and contraction of the pipe and fitting. Accordingly, it is the practice to provide a clearance between the free end of the pipe and the shoulder of the fitting, such clearance amounting to at least one sixteenth inch according to most welding standards. Various tools and apparatus have been proposed heretofore to ensure that such clearance is provided prior to the commencement of the welding operation. For example, a tool of the kind disclosed in applications Ser. Nos. 77,859, filed Sept. 21, 1979, now U.S. Pat. No. 4,306,345 and 148,416, filed May 9, 1980, now U.S. Pat. No. 4,378,937 and the patents, publications, and other devices referred to in such applications. Although such tools are well suited for their intended purposes, it is not possible for an inspector of a string of welded pipes and fittings to ascertain from inspection whether the required clearance has in every case been provided between the shoulder of a fitting and the adjacent end of a length of pipe. An object of this invention, therefore, is to provide a tool for use in welding pipes and fittings together and which is equipped with means for providing visual confirmation that a clearance between a fitting's internal shoulder and the adjacent end of a length of the pipe has been provided.

Tools of the kind referred earlier usually are hand-held and maintained in clamping relation on a pipe during tack welding of the fitting to the pipe. In some cases the tool interferes to some extent with the tack welding operation. Another object of the present invention, therefore, is to provide for relative movement between the tool and the pipe while the tool is in its clamping position so as to minimize interference with the tack welding operation.

SUMMARY OF THE INVENTION

A tool constructed in accordance with a preferred embodiment of the invention comprises a hand-held clamp having a pair of jaws movable toward and away from one another so as to clamp and unclamp, respectively, a pipe that is to be joined in telescoping relation to the fitting. The jaws are of V-shaped trough configuration and are arranged so that the open sides of the jaws confront one another so as to receive a pipe therebetween. Each jaw supports a mounting bracket on which is mounted at least one shim blade for sliding movements toward and away from the pipe. The thickness of the shim blade corresponds to the spacing to be provided between the free end of the pipe and an internal shoulder formed on the fitting.

One of the jaws has associated therewith a mounting member on which is mounted a pair of spaced, parallel scribes which may be used to inscribe a first mark on the pipe and a second mark on the fitting to be welded thereto while the end of the pipe abuts the internal shoulder of the fitting. The two marks thus will be spaced apart a distance corresponding to the spacing between the scribes. When the fitting is moved relatively to the pipe to provide the desired clearance between the fitting's shoulder and the end of the associated pipe, the distance between the two inscribed marks will be increased. Thereafter, an inspector measuring the distance between the two inscribed marks will be able to confirm that such distance is greater than the spacing between the scribes and thereby verify that a space has been provided between the internal shoulder of the fitting and the adjacent end of the pipe.

The clamping jaws are mounted on their supporting arms by pivotal connections, thereby enabling the supporting arms to be swung relatively to the jaws when the pipe is clamped therebetween. Relative movement between the jaws and the arms facilitates access to the zone at which the fitting is to be tack welded to the pipe.

DESCRIPTION OF THE DRAWINGS

A preferred embodiment of the invention is disclosed in the following description and in the accompanying drawings, in which.

DETAILED DESCRIPTION

Figure 1:
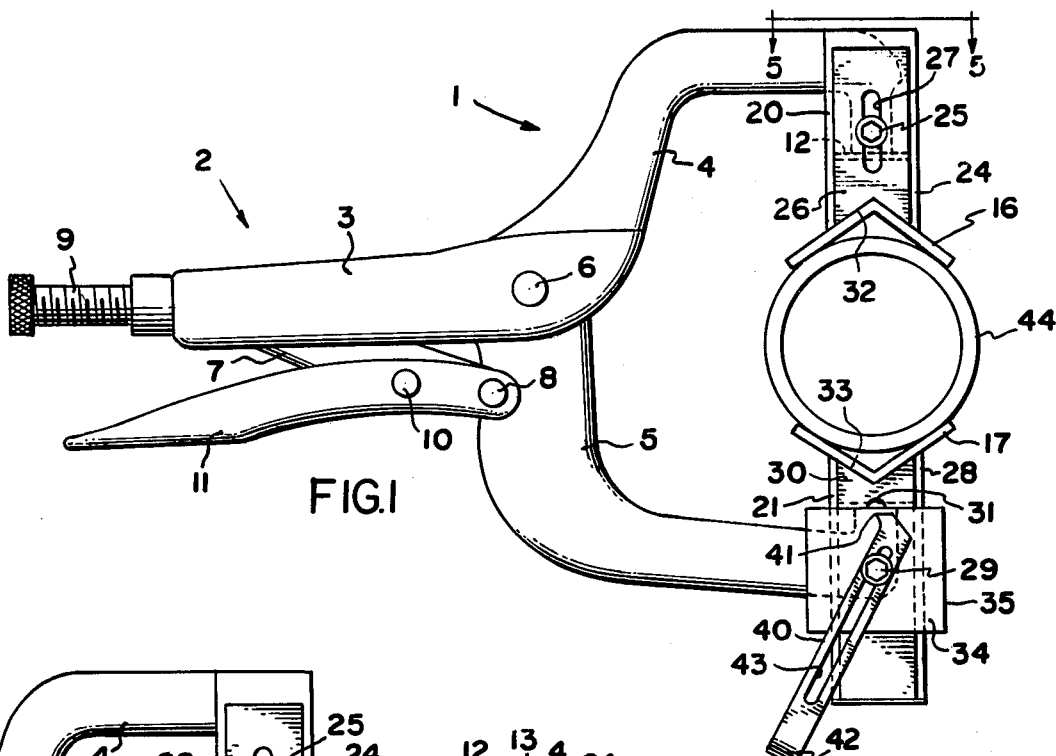
FIG. 1 is a side elevational view of a tool and illustrating it clamped to a pipe.

A tool constructed in accordance with the invention is designated generally by the reference character 1 and comprises a clamp 2 of known construction having a handle 3 to one end of which is fixed an arm 4. A second arm 5 is pivoted to the handle 3 as at 6 so as to enable relative movement of the arms toward and away from one another. A link 7 has one end pivoted to the arm 5 as at 8 and its other end slidably fitted to the handle 3 for adjustment longitudinally of the latter by means of an adjusting screw 9. The link 7 also is pivoted as at 10 to an operating lever 11 which also is pivoted at 8 to the arm 5. The arrangement is such that the arms 4 and 5 may be moved toward one another so as to provide between the confronting ends of the arms a preselected spacing and the arms may be latched in such position as to prevent inadvertent extension of the spacing between the confronting ends of the arms.

At the free end of the arm 4 is welded a disc 12 (FIG. 3) to which is fixed a stem 13 terminating in a ball 14 that is rotatably accommodated in a socket 15 which is fixed to the V-shaped clamp jaw 16. At the free end of the arm 5 is a similar jaw 17 which is rotatably connected to the arm 5 by a ball 18 and socket 19.

Figure 5:
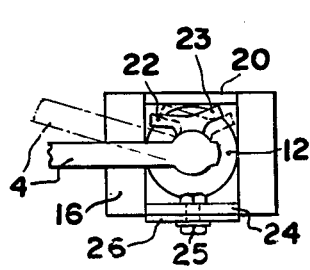
FIG. 5 is a fragmentary top plan view taken on the line 5—5 of FIG. 1.

The jaws 16 and 17 confront one another and have coplanar ends. At one end of the jaw 16 is an upstanding strap 20 and fixed to the corresponding end of the jaw 17 is a corresponding strap 21. The strap 20 forms a stop for engagement by a pair of lugs 22, 23 (FIG. 5) fixed to the arm 4 adjacent its free end so as to limit the extent that the jaw 16 may rotate. The free end of the arm 5 is provided with lugs (not shown) like the lugs 22, 23 and which cooperate with the strap 21 to limit rotation of the jaw 17.

Figure 2:
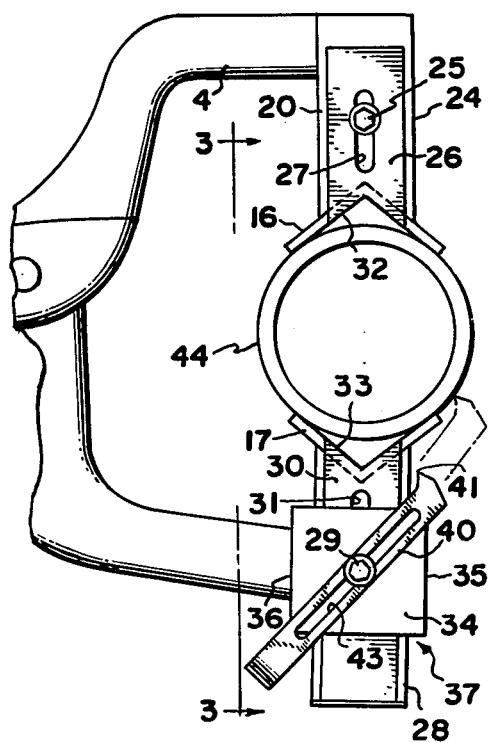
FIG. 2 is a fragmentary view similar to FIG. 1, but illustrating some of the parts in adjusted positions.

The jaw 16 has fixed to that end opposite the strap 20 an upstanding bracket 24 from which projects a headed bolt 25. In sliding engagement with the bracket 24 is a shim 26 having an elongate slot 27 in which the bolt 25 is accommodated. The shim 26 is slidably and vertically adjustable as viewed in FIGS. 1 and 2.

The jaw 17 supports a mounting bracket 28 through which extends the shank of a headed bolt 29. Slidably mounted on the bracket 28 is a shim 30 having a slot 31 in which the shank of the bolt 29 is accommodated.

The shim 26 has a notched end 32 which conforms to the V configuration of the jaw 16 and the shim 30 has a notched end 33 which conforms to the configuration of the jaw 17. The shims 26 and 30 are slidable toward one another from the positions shown in FIG. 1, in which the corresponding ends of the jaws 16 and 17 are exposed, to the positions shown in FIG. 2, in which the shims overlie the ends of the respective jaws. The shims are of equal thickness and are coplanar.

The strap 21 that is fixed to the jaw 17 also has secured thereto frame members 34, 35, and 36 which, together with member 21 forms a four sided frame 37 depending from the jaw 17 and enclosing the free end of the clamp arm 5.

The frame 37 is provided with a pair of scribes 38 and 39. Each scribe comprises an elongate body 40 terminating at one end in a sharp, hardened tip 41 and at its opposite end an operating handle 42. Each body 40 has an elongate slot 43 which accommodates the shank of the bolt 29. Each scribe body 40, therefore, is adjustable longitudinally and rotatably about the axis of the bolt 29.

Figure 3:
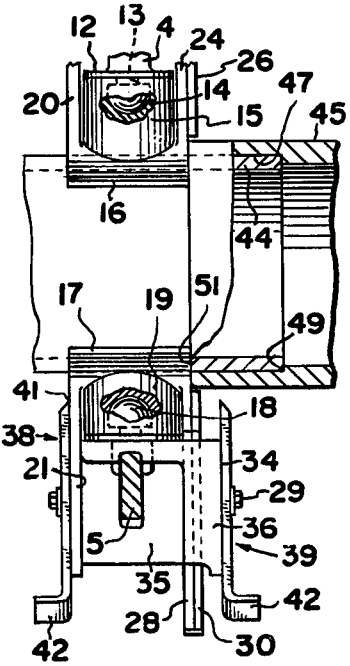
FIG. 3 is a sectional view taken on the line 3—3 of FIG. 2.
Figure 4:
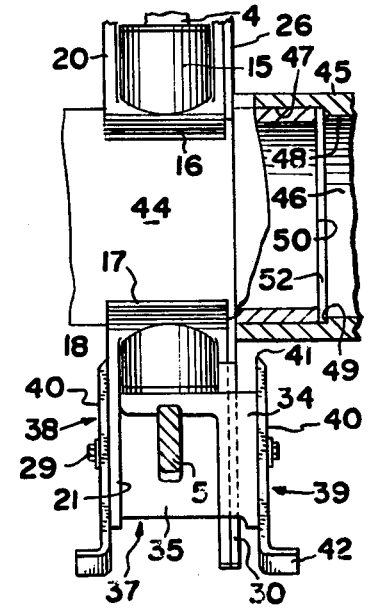
FIG. 4 is a view similar to FIG. 3, but illustrating the parts in adjusted positions.

As is best indicated in FIGS. 3 and 4, the scribe 38 bears against the outboard side of the strap 21 and the scribe 39 bears against the outboard side of the frame member 34. The scribes 38 and 39, therefore, constantly are maintained at a fixed distance from one another.

Apparatus constructed in accordance with the invention is especially adapted for use in the welding of a pipe 44 to a fitting 45. The fitting may be a sleeve, tee, elbow, cross-over, or any other kind of conventional fitting. The fitting 45 comprises a cylindrical body 46 at one end of which is a bore 47. The bore 47 communicates with a smaller bore 48, and between the bores 47 and 48 is an internal shoulder 49. The bore 47 is of such size as snugly to accommodate the pipe 44 with the end 50 thereof abutting the shoulder 49.

To condition the apparatus for operation the arms 4 and 5 of the tool are spread apart and the shim blades 26 and 30 are moved apart so as not to overlie the free ends of the jaws 16 and 17. The pipe 44 is fitted into the bore 47 of the fitting 45 so that the end 50 of the pipe abuts the shoulder 49. The jaws 16 and 17 then are moved toward one another so as to cause them to engage the pipe 44 with the ends of the jaws abutting the adjacent end 51 of the fitting. See FIG. 3. The operating lever 11 then is actuated to clamp the jaws 16 and 17 against the pipe 44 so as to preclude inadvertent relative movement between the jaws and the pipe.

Figure 6:
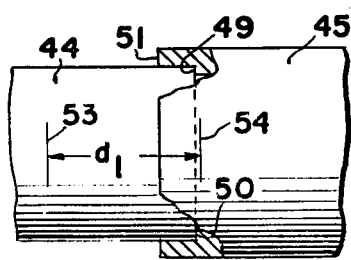
FIG. 6 is a fragmentary, partly sectional and partly plan view of a pipe and fitting in one position of relative adjustment.

Following clamping of the jaws 16 and 17 against the pipe 44, and while the end 50 thereof abuts the shoulder 49 of the fitting 45, the scribes 38 and 39 are manipulated so that the two tips 41 will form a mark 53 on the pipe 44 and a mark 54 on the fitting 45. See FIG. 6. The distance $d_1$ between the marks 53 and 54 will correspond exactly to the spacing between the scribes 38 and 39.

Following the inscribing of the marks 53 and 54 the pipe 44 may be slid outwardly of the bore 47 of the fitting. The shim blades 26 and 30 then may be slid toward one another, or radially of the pipe, to their operative positions in which their notched edges are flush with the jaws 16 and 17 and bear against the pipe. The pipe 44 then may be slid back into the bore 47 toward the shoulder 49 until such time as the shim blades 26 and 30 abut the end 51 of the fitting. See FIG. 4. In this position of the pipe 44 a gap 52 will exist between the shoulder 49 and the end 50 of the pipe 44 and axial length of the gap will correspond to the thickness of the shim blades.

Figure 7:
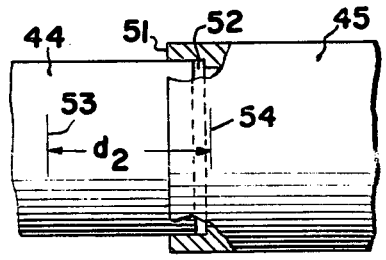
FIG. 7 is a view similar to FIG. 6 but illustrating the parts in adjusted positions.

When the pipe 44 and fitting 45 are moved relatively to one another to form the gap 52 the distance between the marks 53 and 54 will be increased by the axial length of the gap 52. This increased distance is indicated by the reference character $d_2$ in FIG. 7.

Following the establishment of the gap 52, the pipe may be tack welded to the fitting 45 in the peripheral spaces between the jaws 16 and 17 so as to ensure maintenance of the gap 52. Thereafter, the tool may be removed from the pipe 44 and the welding of the latter to the fitting completed.

In the tack welding operation, the ability of the jaws 16 and 17 to pivot relatively to the tool body 2 is of considerable advantage inasmuch as such movement facilitates access of the welder's tools to that side of the fitting which confronts the pivot 6. The extent of pivotal movement of the jaws is indicated by the full and dotted line showings of the arm 4 in FIG. 5.

When the welding of the pipe 44 to the fitting 45 is inspected, the inspector may measure the distance between the marks 53 and 54. If the distance corresponds to distance $d_1$, i.e., if the distance is no greater than the spacing between the scribes 38 and 39, the inspector will know that no gap 52 has been provided.

It is not necessary that the sharp scribing tips 41 be used. They could be replaced by inking pens or the like if scratching of the pipe or fitting is undesirable.

The disclosed embodiment is representative of a presently preferred form of the invention, but is intended to be illustrative rather than definitive thereof. The invention is defined in the claims.

I claim:

1. A welder's clamp comprising a pair of arms connected to one another for rotation about a pivotal axis; a first jaw; means mounting said first jaw on one of said arms for movement therewith; a second jaw; means mounting said second jaw on the other arm of said pair of arms for movement therewith, said jaws being movable in response to movements of said arms about said pivotal axis into and out of clamping engagement with opposite sides of a tubular member having a longitudinal axis; frame means carried by one of said jaws; a first scribe; means mounting said first scribe on said frame means for rotary and reciprocable linear movements in a first plane perpendicular to said pivotal axis into and out of engagement with a tubular member clamped between said first and second jaws; a second scribe; and means mounting said second scribe on said frame means for rotary and reciprocable linear movements into and out of engagement with such tubular member and in a second plane parallel to and spaced a fixed distance from said first plane, said frame means and the mounting means of the respective scribes cooperating to preclude varying the parallelism of and the fixed distance between said first and second planes.

2. A clamp according to claim 1 wherein the distance between said first and second planes corresponds to the width of said frame means.

3. A clamp according to claim 1 including a shim; and means mounting said shim on said frame means for reciprocable movements in a plane parallel to said first and second planes into and out of engagement with a tubular member clamped between said first and second jaws.

4. A clamp according to claim 3 wherein said shim occupies a position between said first and second scribes.

5. A clamp according to claim 1 wherein each of said scribes is movable independently of the other.

6. A clamp according to claim 1 wherein the mounting means for respective jaws is pivoted and enables swiveling movement of said first and second jaws about an axis transverse to the longitudinal axis of said tubular member.

7. A clamp according to claim 6 wherein the mounting means for the respective jaws includes means for limiting swiveling movement of said jaws.

8. A clamp according to claim 6 wherein the mounting means for the respective jaws enables the jaws to partake of said swiveling movement conjointly while said jaws are in clamping engagement with said tubular member.

9. A clamp according to claim 1 wherein said first and second scribes are outboard of said first and second jaws.

10. A welder's clamp comprising a first clamping jaw; a second clamping jaw; means mounting said first and second jaws for movements toward and away from one another into and out of clamping engagement with a tubular member having a longitudinal axis; frame means; means mounting said frame means adjacent one of said jaws for movements therewith; first and second scribes flanking said frame means and being spaced apart by said frame means; and means mounting said scribes for movements in first and second spaced apart, parallel planes into and out of engagement with a tubular member clamped between said jaws, said frame means and the mounting means of the respective scribes cooperating to preclude varying the parallelism of and the spacing between said planes.

11. A clamp according to claim 10 including a shim; and means mounting said shim on said frame means for reciprocable movements in a plane parallel to said first and second planes into and out of engagement with a tubular member clamped between said first and second jaws.

12. A clamp according to claim 11 wherein said shim occupies a position between said first and second scribes.

13. A clamp according to claim 10 wherein each of said scribes is movable independently of the other.

14. A clamp according to claim 10 wherein the mounting means for the respective jaws is pivoted and enables swiveling movement of said first and second jaws about an axis transverse to the longitudinal axis of said tubular member.

15. A clamp according to claim 10 wherein said first and second scribes are outboard of said first and second jaws.

* * * * *